United States Patent [19]

Tatum, Sr

[11] 4,455,191
[45] Jun. 19, 1984

[54] CLOTH WELDING ANVIL

[76] Inventor: Harold E. Tatum, Sr, 4605 St. Rita Dr., Louisville, Ky. 40219

[21] Appl. No.: 440,955

[22] Filed: May 18, 1983

[51] Int. Cl.$^3$ .......................................... B29C 27/08
[52] U.S. Cl. .................. 156/580.2; 156/73.1; 228/1 R; 228/1 B
[58] Field of Search ............. 156/73.1, 73.2, 580.1, 156/580.2; 228/1 R, 1 B; 264/23; 425/174.2

[56] References Cited

U.S. PATENT DOCUMENTS

| | | | |
|---|---|---|---|
| 3,844,869 | 10/1974 | Rust, Jr. | 156/580.1 |
| 4,252,600 | 2/1981 | Cooper | 156/580.2 |
| 4,311,540 | 1/1982 | Hill | 156/580.1 |
| 4,414,045 | 11/1983 | Wang et al. | 156/73.2 |

Primary Examiner—Michael G. Wityshyn
Attorney, Agent, or Firm—Edward M. Steutermann

[57] ABSTRACT

An anvil for use in ultrasonic apparatus for welding two thermoplastic sheets where an ultrasonic vibration transmitter is provided having a working surface in contact with one side of one of the sheetlike materials and located in cooperative relation with opposed spaced anvil surfaces located on the opposite side of the sheetlike elements opposite the transmitter for producing welds in the material therebetween and where the anvils are elongate, hollow, and have a slit extending longitudinally thereof.

6 Claims, 5 Drawing Figures

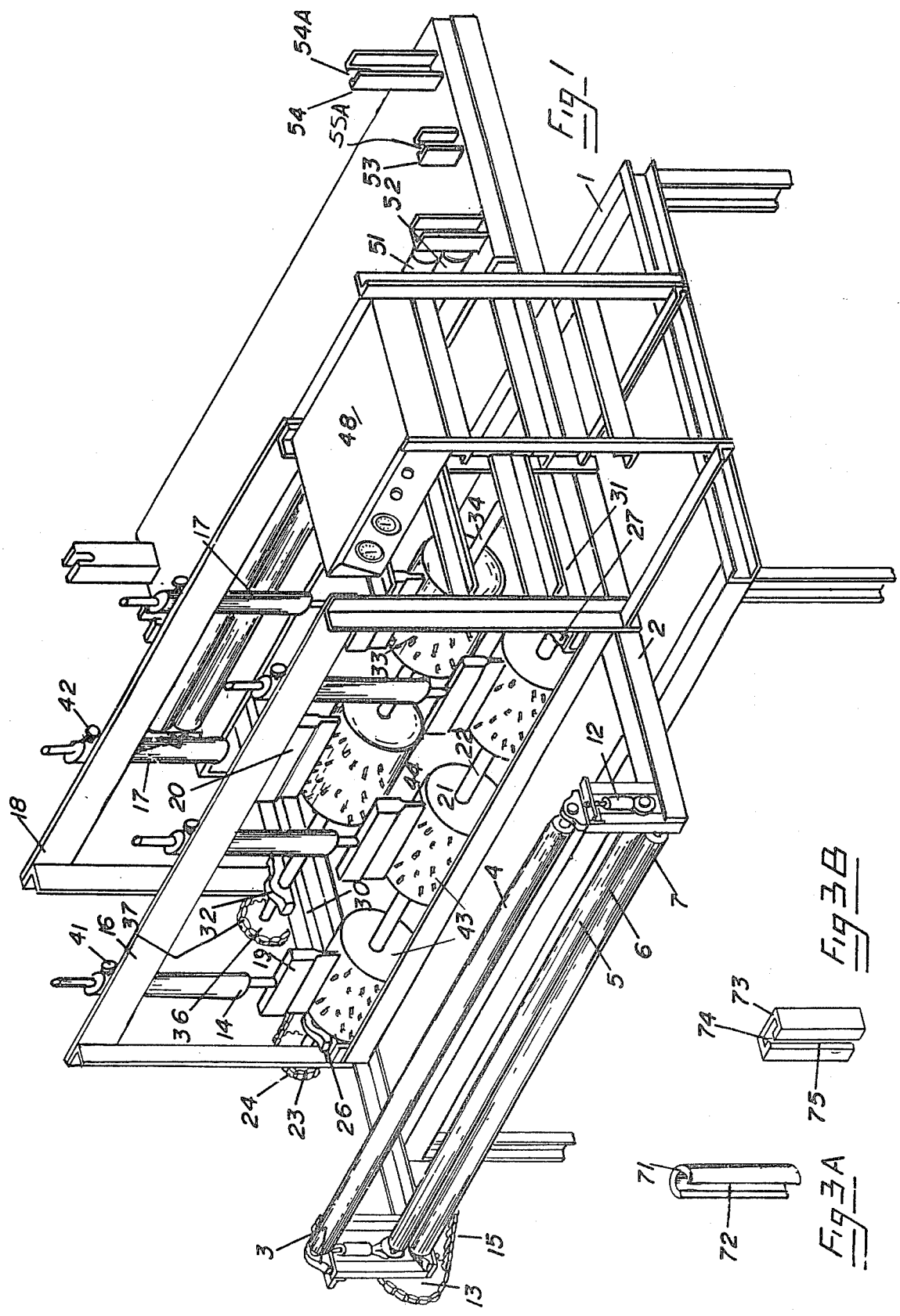

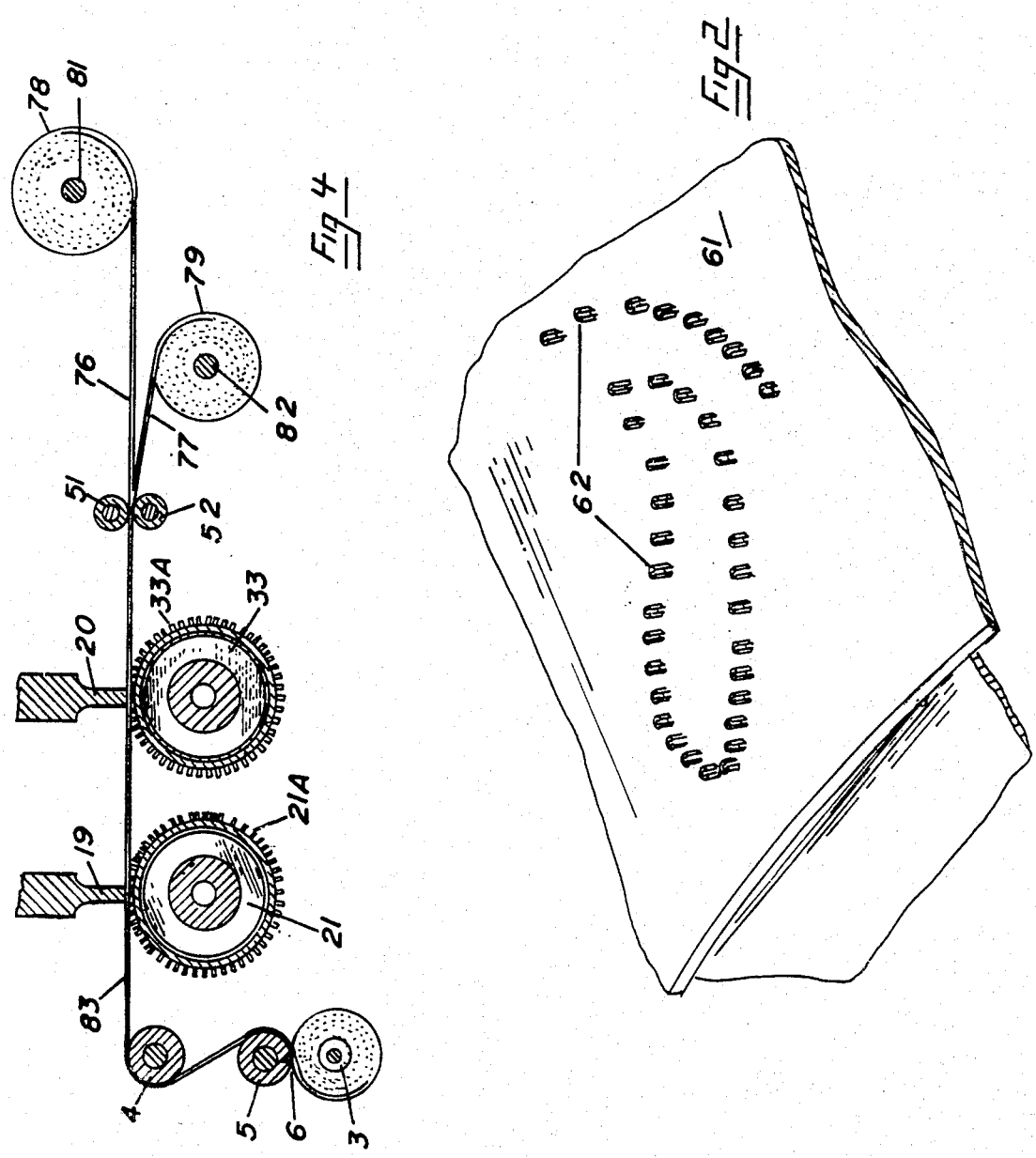

CLOTH WELDING ANVIL

BACKGROUND OF THE INVENTION

The present invention relates generally to procedures known as cloth welding and more particularly to devices to weld together sheets of thermoplastic materials by the use of ultrasonic vibration equipment.

The products so produced are suitable for many uses such as upholstery material, blankets, tablecovers, sleeping bags and many other articles. Apparatus for ultrasonically welding thermoplastic materials are well known in the art for producing seams and overlapping edges of one material to another. One example of such a device is shown in U.S. Pat. No. 3,733,238—Long, et al. In general, the elements to be joined are located between an ultrasonically vibrating member having an elongate working surface and a back up anvil means having raised surfaces located in the desired area of the weld. The anvils are heated by the ultrasonic transmitter to weld the sheets of material together in the area of the anvil. In many applications the anvils are carried on the surface of a drum which is rotated with the feed of the materials to be joined and extend outwardly therefrom to be sequentially located beneath the transmitter as the drum turns. Insofar as presently known, the prior art teaches a single drum carrying anvils where multiple transmitters are provided in staggered orientation.

In general the width of the vibration transmitting members is a limitation on the width of the material which can be joined. However, by the use of numerous vibration transmitting members, full width fabrics can be joined. The vibration transmitting members cannot be in contact with each other but by proper placing of the anvils and by overlapping of the vibrating transmitting means full width transmitting means full width patterns can be produced.

In welding of cloth material the clearance between the vibration transmitting device and the anvils is critical. For example, a 0.001 inch clearance is desirable between the anvil and the vibration transmitting device and the tops of the anvils should be flat to provide uniform clearance. The power required to be applied to the vibration transmitting device to accomplish welding is dependant upon the clearance between the anvil and the transmitting device and the mass of the anvils. In prior art devices it has been necessary to maintain uniform clearance between the anvil and the transmitter and further in prior art devices using solid anvils, it is necessary to always have the same number of anvils exposed to the transmitter because if fewer anvils are present the total power of the transmitter is utilized by the fewer number of anvils and overheating and burn through occurs so a hole is formed. On the contrary, if more than the requisite number of the prior art anvils are located beneath the transmitter the power is insufficient to properly heat the anvils so welding does not occur.

Prior art devices have generally provided solid, for example, circular, anvils or solid elongate anvils.

No prior art device is known where a semi-enclosed anvil is utilized using substantially less mass in an anvil whereby the weld strength is improved and the likelihood of "burn through" is substantially reduced.

SUMMARY OF THE INVENTION

The present invention provides an ultrasonic fabric welding apparatus which utilizes a plurality of vibration transmitting members to produce full width welded sheet materials where it has been unexpectedly found that the use of anvils within the scope of the present invention reduce the liklihood of "burn through" and the power consumption required for operation of the devices.

Additionally, it has been found that the use of anvils within the scope of the present invention allows a substantial increase in the operating speed of the devices within the scope of the present invention and further permits the use of greater number of anvils beneath a given vibration transmitting device. That is, the allowable patterns which can be produced in the material can be increased by virtue of the fact that the decreased anvil mass alllowed by the present invention allows the use of additional anvils to provide closer patterns.

Moreover the use of anvils within the scope of the present invention avoid "burn through" even if excess power is provided by the transmitter so that it is not necessary to continuously have the same number of anvils beneath the transmitter. That is in the event of excessive power to the anvils the area exposed to the anvil does not fall out.

It has further been found that the use of anvils within the scope of the present invention allows new flexibility in the designs that can be utilized for cloth welding and contrary to prior art devices which are limited to repetitive identical pattern devices within the scope of the present invention can be utilized to produce independant, nondirectional, nonrepeating patterns because of the ability to vary the number of pins beneath the transmitter. Further devices within the scope of the present invention do not require continuous welding but allow breaks in the pattern to permit separation of design patterns in the product.

Moreover devices within the scope of the present invention can provide multiple drums in staggered orientation to permit additional flexibility where it has been found that the use of a single drum adversely affects operation of the device because it is difficult to maintain optimum clearance between the anvils and the transmitter across the width of a long drum.

More particularly, the present invention provides an anvil for use in ultrasonic apparatus for welding two thermoplastic sheets where an ultrasonic vibration transmitter is provided having a working surface in contact with one side of one of the sheetlike materials and located in cooperative relation with opposed spaced anvil surfaces located on the opposite side of the sheetlike elements opposite the transmitter for producing welds in the material therebetween and where the anvils are elongate, hollow, and have a slit extending longitudinally thereof.

Examples of arrangement within the scope of the present invention are illustrated in the accompanying drawings. However, it will be understood that the drawings and the explanations thereof are not by way of limitation but that various other arrangements also within the scope of the present invention will occur to those skilled in the art upon reading the disclosure.

BRIEF DESCRIPTION OF THE DRAWINGS

In the examples of the present invention shown in the accompanying drawings:

FIG. 1 is a perspective view of an arrangement to provide a welded fabric;

FIG. 2 is an enlarged view of a drum carrying anvils within the scope of the present invention;

FIGS. 3A and 3B are examples of anvils within the scope of the present invention; and FIG. 4 is a schematic view of a welding operation within the scope of the present invention.

DETAILED DESCRIPTION OF THE DRAWINGS

FIG. 1 is a perspective view of one example of a device within the scope of the present invention wherein a frame 1 is provided carrying a secondary frame 2 which is adapted to carry takeup roll 7 and pressure roll 5 as described hereinafter. An idler roller 4 is provided in general alignment with the top of the rolls 3 and 5. A nip 6 is provided between pressure roll 5 and roll 7 which is driven by sprocket 13 and chain 15 as shown to pull fabric through the device as described hereinafter. Pressure roll 5 is retained against roll 3 by means of cylinders 12 located in frames at opposite ends of frame 2. The pressure applied by actuaters 12 to roll 5 permits the roll 3 to pull the fabric through the device as is understood in the art.

Electrotransducer units or transmitters 14 are mounted on a framework 16 and transducer units 17 are mounted on a framework 18 as shown to provide ultrasonic vibration transmitting horns 19 and 20 carried by transducer units 14 and 17 respectively as shown. Horns 19 and 20 are located so that the entire width of the frame 2 is covered by the horn members.

Pattern rolls 21 are provided to be rotated on shaft 22, which extends transverse of frame 2, by means of sprockets 23 driven by chain 24. Shaft 22 is journaled at opposite ends in journals 26, 27 which are mounted on frame members 31, 32. Likewise a second set of pattern rolls 33 are carried by a shaft 34 where a journal 32 is provided on frame 30 and a similar journal (not shown) is provided at the opposite end of shaft 34. Shaft 34 is driven by a sprocket 36 driven by chain 37. In the case of each of the transducers 14, 17, the height of the horn 19, 20 is adjusted by means of hand wheels 41, 42 respectively so that the height of horns 19 and 20 can be carefully set with respect to the circumference of pattern rolls 21, 33.

Pattern rolls 21, 33 are generally cylindrical in shape and are provided with pins 43, 44 which serve as anvils for the electrosonic welding which occurs in the device. Anvils 43, 44 are disposed in selected orientation on drums 21, 33 to provide a selected pattern to over lying material drawn between the horns 19, 20 and the rolls 21, 33.

A power supply 48 is provided to supply power to transducer units 14, 17. It will be understood that separate power supply can be provided for each of the transducer units but in any event adequate numbers of power supplies are provided to fully power the transducer units.

As also shown in FIG. 1 a pair of nip rollers 51, 52 are provided before the first set of pattern rolls 33 and two sets of brackets 53, 54 are also provided to receive reels of material to be welded.

FIG. 2 is a somewhat larger view of a typical surface of a pattern roll such as roll 21 or 33. As shown in the Figure, the surface 61 of the roll is generally uniform while the pins or anvils 62 extend upwardly therefrom.

In the arrangement shown, within the scope of the present invention the pins 62 are of generally "C" shaped cross section being elongate along the longitudinal axis thereof and having a generally hollow center with a longitudinal slit, to form the "C" shaped cross section. As previously described, within the scope of the present invention, it has been unexpectedly found in accordance with the present invention that the use of pins of the type shown in FIG. 2 provide improved results in welding of thermoplastic materials.

FIGS. 3A and 3B are enlarged perspective views of examples of pins which have been found satisfactory within the scope of the present invention. FIG. 3A is a pin of the type shown in FIG. 2 where a generally hollow center 71 is provided with longitudinal slit 72 forming a generally "C" shaped cross section pin. The pin is attached to the surface, for example surface 61 of the drum segment shown in FIG. 2, by welding or other suitable means so that the pins are diametrically outwardly from the surface of the drum. After all the pins are attached then a machine operation is performed to assure that the diameter of the outer surface of all of the pins is equal so that the clearance between the outer surface of each of the pins and the horns, for example horns 19, 20 of FIG. 1 is uniform and so that the welding spacing can be accurately set.

FIG. 3B is an example of another pin within the scope of the present invention having a generally rectangularly cross section with a hollow center 74 and an elongate slit 75.

It has been found that a semi-enclosed cross section anvils provide the heat dissapation, but with sufficient heat concentration, to effect welds of thermoplastic material yet prevent the "burn through" or hole formation in the materials in the event of overpowering of the welding device. Further it has been found that in the use of pins of the type shown in the Figures and in accordance with the present invention it is not necessary to continually have the same number of pins exposed to the welding area beneath one of the horns 19, 20 but that some latitude is permissable without adversely affecting the product.

As shown, the vibration in FIGS. 1 and 4, the vibration transmitting members 14 and 16 and the horns 19 and 20 are offset and arranged in two rolls across the width of frame 2 with alternate members being off set in the direction of travel of the material to be welded as shown in FIG. 4. In one alternative in connection with the arrangement shown to insure that each point across the width of the sheetlike elements comes in contact with at least one of the working surfaces the horns 19 and 20 overlap slightly in the lengthwise direction of the material so that the entire width of the material can be welded.

It will be further understood that the sprockets 23 and 36 are rotated at speeds to provide uniform advancement of the material to be welded to prevent unnecessary stretching or slackening of the material. FIG. 4 is a schematic elevational view of the operation of the device and illustrates an arrangement where 2 sheets 76, 77 are welded together. The materials of sheets 76, 77 are carried on reels 78, 79 as shown which are supported by rods 81, 82 received in notches 53A, 54A of brackets 53 and 54. The sheets 76, 77 are fed through nip rollers 51, 52 for positioning of the sheets and the material is then fed beneath first horns 20 and in contact with pins 33A of roll 33 and then in contact with pins 21A of roll 21, as the material passes beneath the horns 19 as shown. The welded sheet 83 is then passed over roller 3 and through nip 6 between rolls 3 and 5 to be reeled onto roll 3 as a finished product.

The invention claimed is:

1. Anvil means carried on the peripheral surface of cylindrical drum means which is rotatable about its longitudinal axis for use in ultrasonic welding together of first and second thermoplastic sheets where the inner surfaces of said first and second sheets are in contact; ultrasonic vibration transmitting means having a working surface in contact with the outer surface of said first sheet so that upon rotation of said drum means said anvil means are periodically located in opposed, aligned, spaced relation with said ultrasonic vibration transmitting means where said anvil means are located adjacent the outer surface of said second sheet to contact said outer surface of the second sheet as the drum means is rotated so the first and second sheets are located between said ultrasonic transmitting means and said anvil means and said anvil means is heated by ultrasonic transmission from said ultrasonic transmitting means to thermally weld the sheets together in areas adjacent said anvil means and where the anvil means are of elongate, tubular configuration, and have a slit extending longitudinally thereof along a portion of the length thereof.

2. The invention of claim 1 wherein the end of said anvil means exposed to said second sheet is of generally "C" shape cross section.

3. The invention of claim 1 wherein the end of said anvil means exposed to said second sheet is of generally rectangular "C" shaped cross section.

4. The invention of claim 1 wherein multiple anvils are provided in spaced relation in selected configuration on the surface of said drum means and where said first and second sheets are advanced along an axis between said drum means and said ultrasonic vibration transmitting means at a speed generally equal to the speed of the outer surface of said drum.

5. The invention of claim 4 wherein said drum means includes at least one first and at least one second drum means located in offset position generally on opposite sides of said axis and in spaced relation along said axis so said sheets contact said first drum means then said second drum means as said sheets are advanced.

6. The invention of claim 5 including sheet feeding means located on a feed side of said drum means and a sheet takeup means located on opposite side of said drum means along said axis where said sheet takeup means pulls said first and second sheets over the surfaces of said first and second drums.

* * * * *